(12) United States Patent
Hayman

(10) Patent No.: US 6,898,987 B1
(45) Date of Patent: May 31, 2005

(54) FLOW METER

(75) Inventor: Robert W. Hayman, Elizabeth City, NC (US)

(73) Assignee: Hoffer Flow Controls, Inc., Elizabeth City, NC (US)

( * ) Notice: Subject to any disclaimer, the term of this patent is extended or adjusted under 35 U.S.C. 154(b) by 0 days.

(21) Appl. No.: 10/829,562

(22) Filed: Apr. 22, 2004

(51) Int. Cl.[7] .............................................. G01F 15/00
(52) U.S. Cl. ................................................. 73/861.77
(58) Field of Search ......................... 73/861.77, 861.76, 73/861.78

(56) References Cited

U.S. PATENT DOCUMENTS

| | | | |
|---|---|---|---|
| 4,498,497 A | | 2/1985 | Rosaen |
| 5,728,949 A | * | 3/1998 | McMillan et al. ....... 73/861.77 |
| 5,992,230 A | | 11/1999 | Scarpa et al. |
| 6,012,339 A | * | 1/2000 | Genack et al. ........... 73/861.77 |

* cited by examiner

*Primary Examiner*—Edward Lefkowitz
*Assistant Examiner*—Jewel Thompson
(74) *Attorney, Agent, or Firm*—Coats & Bennett, P.L.L.C.

(57) ABSTRACT

A flow meter includes a cylindrical flow chamber having an axis and an internal cylindrical wall. Axially spaced about opposite ends of the flow chamber are an inlet and an outlet. Both the inlet and outlet are oriented generally tangential with respect to the interior cylindrical wall. Rotatively mounted about the axis of the chamber is a rotor but wherein the rotor is mounted within the chamber between the inlet and outlet. Fluid entering the chamber via the inlet tends to spiral around the axis of the chamber and generally moves axially in the process to where the fluid engages and turns the rotor but wherein the fluid continues to move axially through the chamber to where the fluid exits the outlet.

27 Claims, 3 Drawing Sheets

FLOW METER

FIELD OF THE INVENTION

The present invention relates to flow meters, and more particularly to a flow meter having a cylindrical chamber and wherein the fluid being measured moves axially through the flow chamber.

BACKGROUND OF THE INVENTION

Conventional turbine flow meters utilize a rotor for measuring the flow rate of a fluid. These conventional turbine designs utilize a rotor that is aligned to the flow path of the fluid being measured. That is, the general direction of the entering flow is aligned with the axis of the rotor. Such rotors have blades that are generally positioned angularly to the flow path. As the velocity of the fluid increases, the rotor will rotate. The speed of rotation of the rotor is proportional to the velocity of the fluid passing across the rotor.

It is quite difficult to mechanically measure fluid flow at low fluid velocities with conventional turbine flow meters. One of the problems in precisely measuring low flow rates with a mechanical device is that the flow meter must overcome the effects of friction and inertia. That is, the velocity of the fluid being measured must be sufficient to overcome the effects of friction and inertia in order for the flow meter to properly function and to measure relatively low flow rates.

Therefore, there has been and continues to be a need for a turbine type flow meter that will precisely measure low flow rates.

SUMMARY OF THE INVENTION

A flow meter is provided that includes a housing and a cylindrical flow chamber including a cylindrical inner wall and opposed end portions. An inlet is formed at one end portion of the chamber for directing fluid into the chamber. An outlet is formed at the other end portion of the chamber for directing fluid from the chamber. The chamber includes an axis and wherein the inlet and outlet are axially spaced and disposed about opposite end portions of the chamber. A rotor is rotatively mounted about the vertical axis of the chamber and axially spaced between the inlet and outlet such that the inlet, outlet and rotor lie in separate traverse planes. The chamber, inlet, outlet and rotor are arranged such that the fluid entering the chamber at the inlet is constrained to move axially through the chamber past the rotor and then onto the outlet where the fluid exits the chamber.

In one embodiment, the flow meter comprises a housing and a cylindrical flow chamber disposed within the housing and having an interior cylindrical wall. A rotor is rotatively mounted within the flow chamber. An inlet is formed in the housing and opened to the chamber for directing fluid into the chamber. Likewise an outlet is formed in the housing and opened to the chamber for directing fluid from the chamber. The inlet and outlet are axially spaced with respect to the flow chamber, and the rotor is rotatively mounted between the inlet and the outlet, but axially spaced from both the inlet and the outlet. The inlet is oriented with respect to the interior wall of the chamber such that the fluid directed into the chamber via the inlet is directed generally tangential to the interior wall of the chamber. The orientation of the inlet with respect to the rotor and interior wall of the chamber results in fluid flow directed into the chamber spiraling around the interior wall and engaging and turning the rotor prior to being directed out the outlet.

In addition, the present invention entails a method of measuring fluid flow by directing fluid through an inlet into a cylindrical flow chamber having an axis and a cylindrical interior wall such that the fluid entering the chamber is directed in a direction generally tangential to the interior wall. Once in the flow chamber, the fluid moves from the inlet axially through the chamber and at least some of the fluid tends to spiral around the axis. As the fluid moves axially through the chamber the fluid engages the rotor causing the rotor to rotate. After engaging the rotor, the fluid continues to move through the chamber to where the fluid is directed out an outlet.

Other objects and advantages of the present invention will become apparent and obvious from a study of the following description and the accompanying drawings which are merely illustrative of such invention.

DETAILED DESCRIPTION OF THE INVENTION

Figure 1:
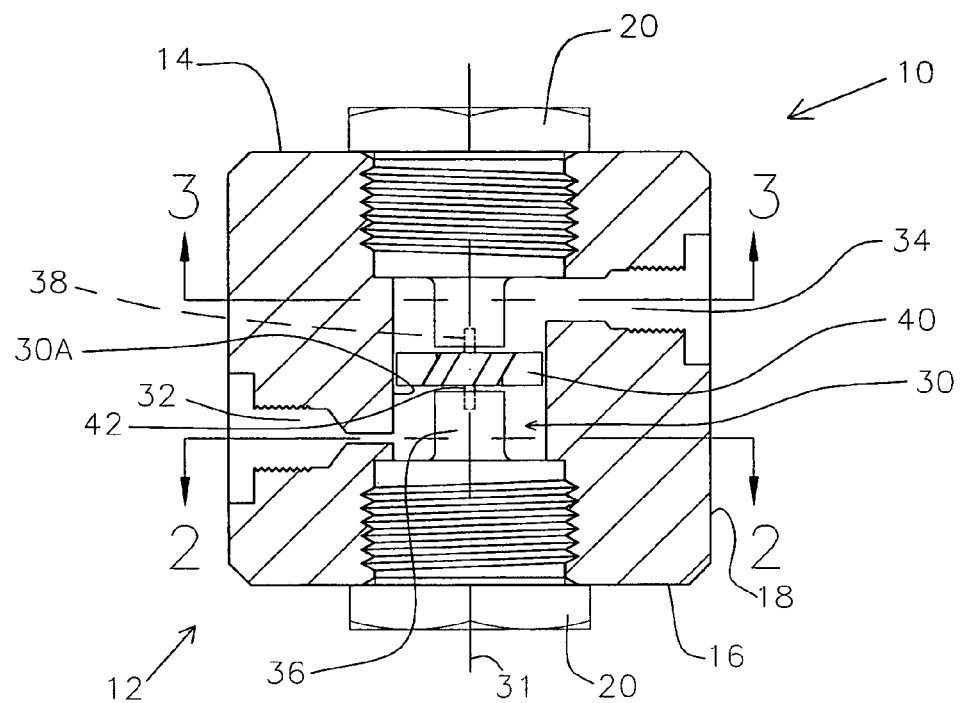
FIG. 1 is a vertical cross sectional view of the flow meter illustrating the inlet, outlet and the rotor and the relationship between the inlet, outlet and rotor.

With further reference to the drawings the present invention is shown therein and indicated generally by the numeral 10. Flow meter 10 comprises a housing indicated generally by the numeral 12. Housing 12 includes a top 14, a bottom 16, and sidewall 18. Housing 12 can be constructed of various materials but it is contemplated that in one embodiment the flow meter 10 would be constructed of stainless steel.

A central bore is formed in the housing 12. The central bore includes opposed threaded portions. Secured into both of the opposed threaded portions of the bore is a threaded plug 20. When the threaded plug 20 is securely screwed into the threaded bore, a fluid tight or sealed relationship is established between each threaded plug 20 and the housing 12.

A flow chamber 30 is formed within the housing 12. In particular, flow chamber 30 is a generally cylindrical chamber that is formed by the central bore formed in the housing 12 and the two threaded plugs 20. Flow chamber 30 includes an interior cylindrical wall 30A. Thus, the bounds the flow chamber 30 is formed by the interior wall 30A, which forms a part of the bore of the housing 12, and the threaded plugs 20.

Figures 2, 3:
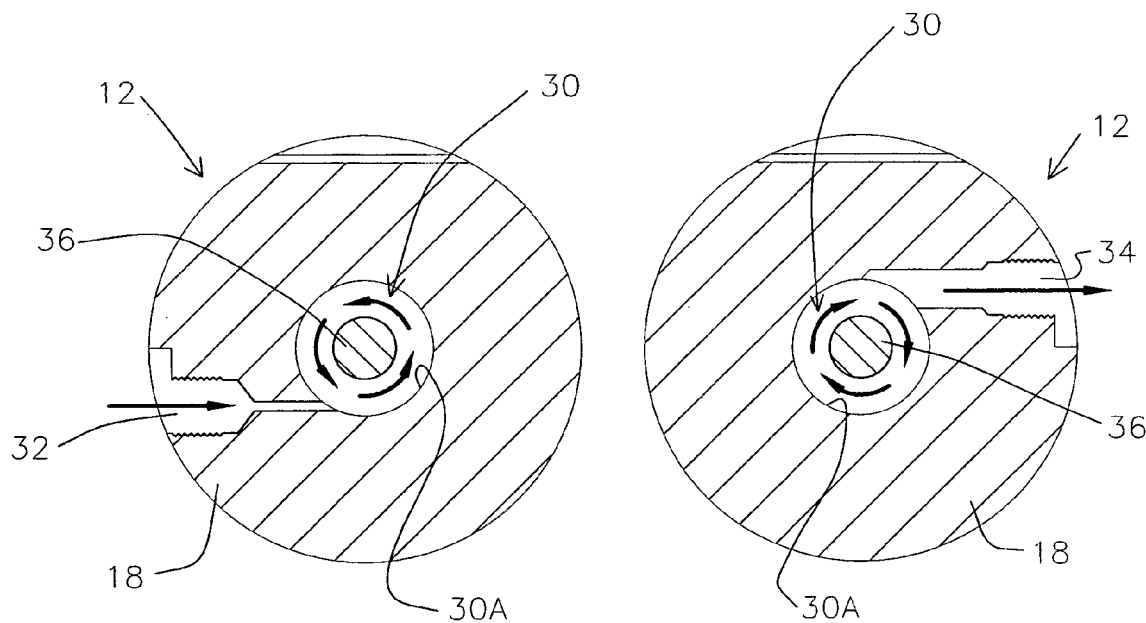
FIG. 2 is a transverse sectional view of the flow meter showing the relationship of the inlet to the flow chamber.
FIG. 3 is a transverse sectional view of the flow meter showing the relationship of the outlet to the flow chamber.

Formed in the wall structure of the housing is a fluid inlet 32. This is illustrated in FIGS. 1 and 2 of the drawings. Fluid inlet 32 extends from the outer wall 18 of the housing 12, through the wall structure of the housing and to the interior wall 30A of the flow chamber. Fluid inlet 32 is particularly oriented with respect to the flow chamber 30 such that it extends in generally tangential relationship to the interior wall 30A. See FIG. 2. That is, as will be described subsequently herein, fluid being directed into the flow chamber 30 via the fluid inlet 32 will enter the flow chamber in a direction that is generally tangential to the interior wall 30A that lies adjacent the fluid inlet 32.

Likewise there is provided a fluid outlet 34. Note in FIG. 1 where the fluid outlet 34 is axially spaced from the fluid inlet 32. That is, for purposes of reference, it is said that the flow chamber 30 includes an axis that is referred to by the numeral 31. Thus, again as viewed in FIG. 1, the fluid outlet 34 is axially spaced from the fluid inlet 32. Like the fluid inlet 32, the outlet 34 is oriented with respect to the flow chamber 30 such that it extends in a generally tangential relationship with respect to the adjacent interior cylindrical wall 30A. That is, as seen in FIG. 3, outlet 34 is positioned with respect to the interior wall 30A such that it extends in a direction that is generally tangential to the adjacent interior wall 30A.

Each threaded plug 20 includes an inner end portion or shoulder 36 that projects into the flow chamber 30. Each shoulder includes a face that includes a seat or bore 38 formed therein. As will be appreciated from subsequent portions of this disclosure, the seat or bore 38 is adapted to receive a shaft that will in turn support a rotating rotor.

Figure 4:
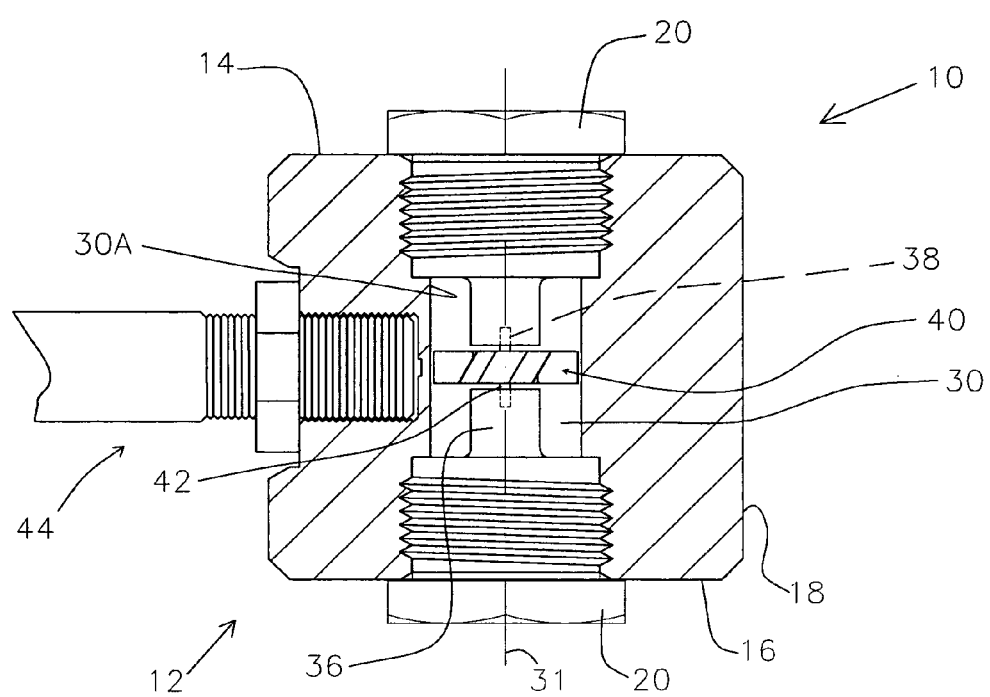
FIG. 4 is another vertical sectional view of the flow meter, but illustrating a flow-sensing element connected to the housing of the flow meter.
Figure 5:
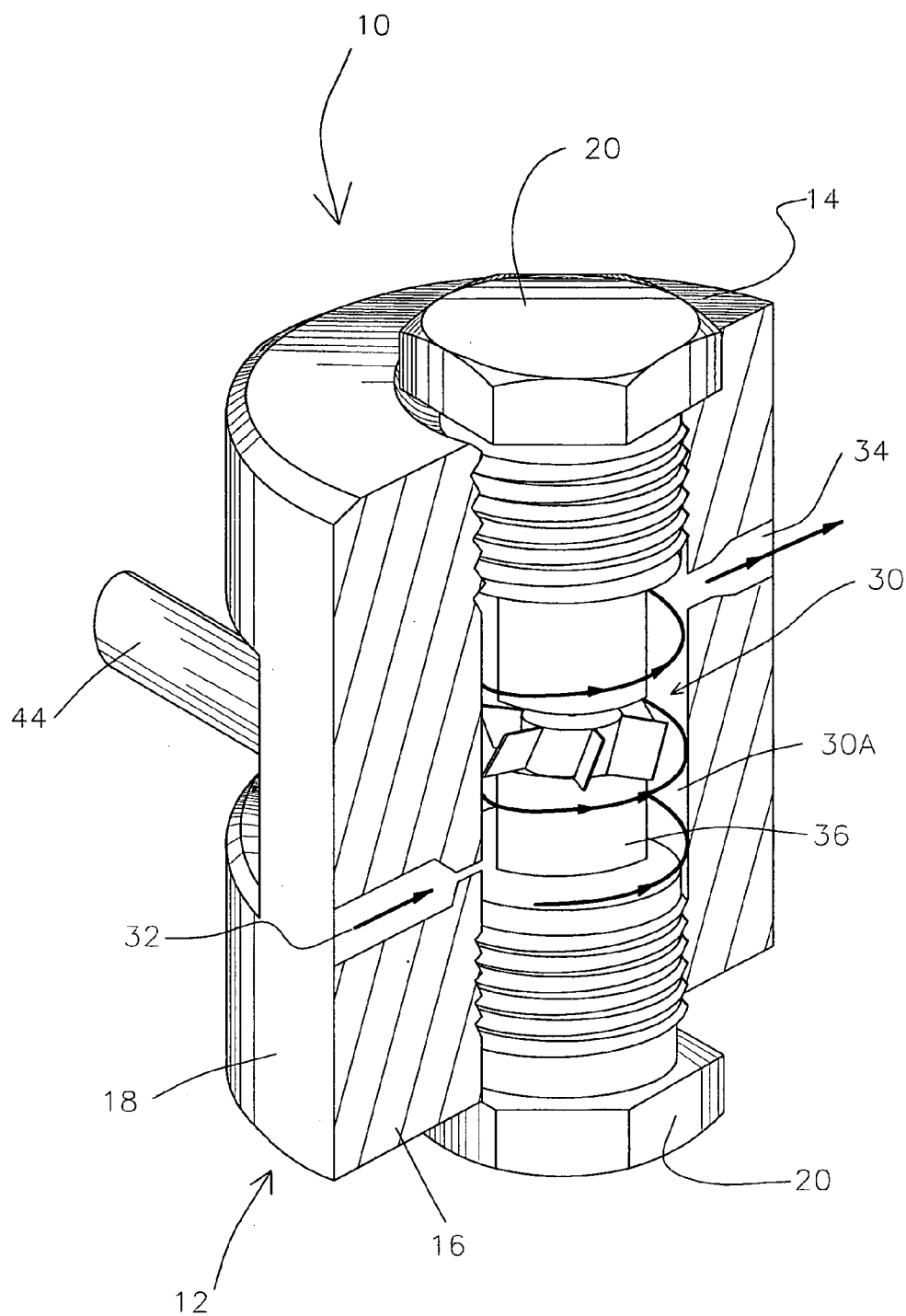
FIG. 5 is a fragmentary perspective view illustrating components of the flow meter.

Rotatively mounted between the shoulders 36 of the respective plugs 20 is a rotor 40. Rotor 40 includes a series of blades that extend outwardly therefrom. Although the rotor 40 may be constructed of various materials, it is contemplated that in one embodiment, that the rotor would be constructed of magnetic steel in order to be compatible with a conventional magnetic sensor/counter. As noted above, the opposed shoulders 36 of the threaded plugs 20 are designed to hold, retain and generally support a shaft. As seen in the drawings, a shaft 42 extends through the rotor 40 and into the opposed seats 38 formed in the shoulders 36 of the threaded plugs 20. Rotor 40 is bearinged on the shaft 42. The bearing, in conventional fashion, can be accomplished with ball bearings or a bushing. It should also be noted that the seats 38 formed in the shoulders 36 of the threaded plugs 20 may permit the shaft 42 to move or float up and down therein. As seen in FIGS. 1, 4 and 5, rotor 40 is positioned between the shoulders 36 such that there is a relative small space between the top and bottom of the rotor 40 and the adjacent faces of the shoulders 36. It is desirable that the top and bottom portions of the rotor 40 do not engage and drag against the face of the shoulders 36. To minimize the potential for drag and consequently friction, each face of each shoulder 36 can be provided with a thin annular ring that extends outwardly from the face. This would assure that the entire surface of the face of the shoulders 36 is not engaged by the rotor but that at most the only engagement that would occur would be between a portion of the rotor 40 and the annular rings.

The blades projecting from the rotor 40 can be oriented in any number of configurations. It may be preferred to orient the blades such that they extend generally perpendicular to the direction of fluid flow through the flow chamber 30. As will become apparent from subsequent portions of the disclosure, because it is contemplated that the fluid flow would follow a spiral path around the axis 31 of the flow chamber 30, the blades would be accordingly angled to result in the fluid flow generally contacting the blades generally perpendicularly.

Flow meter 10 would be provided with a conventional flow sensor mechanism. Details of such a flow sensor mechanism is not dealt with herein because such is not material per se to the present invention and further because flow sensors for use in conjunction with flow meters are well known and appreciated by those skilled in the art. However, as illustrated in FIG. 4, a portion of a flow sensor mechanism is screwed into the housing 12 of the flow meter 10 and this portion of a conventional flow sensor mechanism is referred to generally by the numeral 44. As noted before, numerous types of conventional flow sensors or counters can be utilized. Typically flow meters of this type utilize a magnetic sensor or counter which essentially counts the revolutions of the rotor 40 as fluid moves through the flow chamber 30. In addition to magnetic sensing devices, a variety of other commonly employed actuator-sensor technologies are also available which can effectively and efficiently perform the same function. Optical encoders, for example, are commonly utilized to perform tasks similar to those performed by magnetic sensors or counters.

Turning to FIG. 5, it is seen that the fluid inlet 32 is axially spaced with respect to the fluid outlet 34. In addition, rotor 40 is positioned between the inlet 32 and the outlet 34. In this particular embodiment, the inlet 32, rotor 40 and outlet 34 lie in separate transverse planes relative to the axis 31 of the flow chamber 30. Because of the tangential orientation of the inlet 32 and outlet 34 with respect to the interior wall 30A of the flow chamber 30, it is postulated that a substantial portion of the fluid flow passing through the chamber 30 will do so by moving in a spiral path or configuration. That is, it is believed that the fluid entering through inlet 32 into the chamber 30, as illustrated in FIG. 5, will tend to spiral around the interior cylindrical wall 30A. As the fluid flow spirals around the interior wall 30A that the fluid will also move axially from inlet 32 past the rotor 40 and out the outlet 34. It is believed that as the fluid enters the chamber 30 from the inlet 32 that initially the fluid will not engage the rotor 40. But as the fluid spirals and moves axially through the chamber 30, that the fluid will come into contact with the rotor 40 and turn the rotor. It is believed that the fluid will engage the rotor for a full 360° and thereafter continue to move axially towards the outlet 34 where the fluid is discharged from the chamber.

It is contemplated that the flow meter 10 of the present invention may perform better when vertically oriented such as shown in FIG. 1. By vertical orientation, it is meant that the axis 31 of the flow chamber 30 is oriented in a vertical position and the inlet 32 is disposed below the outlet 34. If the flow meter is oriented horizontally, the fluid may initially have to have sufficient energy to "climb" the interior wall and that may have an adverse effect on the accuracy of the flow meter 10 at very low flow rates.

The flow meter 10 of the present invention may accurately measure liquids, for example, at a rate of 0.01 gal/min. to 1 gal/min. This yields an effective turn down ratio of 100.

The present invention is designed to precisely measure relatively low flow rates. It is believed that the design and particularly the orientation of the inlet and outlet with respect to the rotor 40 and the cylindrical chamber 30 will minimize the adverse effects of friction and inertia when measuring these low flows.

Reference is made to U.S. Pat. No. 5,992,230 which describes a turbine type flow meter. The disclosure of U.S. Pat. No. 5,992,230 is expressly incorporated by reference.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A flow meter comprising:
   a. a housing;
   b. a cylindrical flow chamber disposed in the housing and having an interior cylindrical wall and an axis;
   c. a rotor rotatively mounted within the flow chamber;
   d. an inlet formed in the housing and open to the chamber for directing fluid into the chamber;
   e. an outlet formed in the housing and open to the chamber for directing fluid from the chamber;
   f. the inlet and outlet being axially spaced with respect to the axis of the flow chamber;
   g. the rotor mounted between the inlet and outlet, along the axis of the flow chamber, but axially spaced along the axis of the flow chamber from both the inlet and the outlet;
   h. the inlet oriented with respect to the interior cylindrical wall of the cylindrical flow chamber such that the fluid directed into the chamber via the inlet is directed generally tangential to the interior wall of the chamber; and
   i. wherein the orientation of the inlet with respect to the rotor and interior wall of the chamber causes the fluid directed into the chamber to spiral around the interior wall and move from the inlet around the rotor, causing the rotor to rotate, and out the outlet.

2. The flow meter of claim 1 wherein the cylindrical flow chamber is formed by the housing and a pair of opposed threaded plugs secured within threaded portions of the housing.

3. The flow meter of claim 2 wherein each threaded plug includes an inner end portion; and wherein the rotor rotates about a shaft that extends through the rotor and is received in the inner end portions of the threaded plugs.

4. The flow meter of claim 3 wherein each end portion of the threaded plug includes a face, and wherein the rotor is supported between the faces of the threaded plugs such that the rotor is generally spaced from the faces.

5. The flow meter of claim 1 wherein the outlet is oriented generally tangential to the cylindrical interior wall of the flow chamber.

6. The flow meter of claim 5 wherein the outlet is larger than the inlet.

7. The flow meter of claim 1 including a sensor for determining the rotational speed of the rotor.

8. The flow meter of claim 1 wherein the cylindrical cylinder is oriented such that the axis of the cylinder extends vertically, and wherein the inlet is disposed below the rotor and the outlet is disposed above the rotor.

9. The flow meter of claim 1 wherein the flow meter is adapted to be stationed when measuring flow such that the axis of the chamber extends generally vertically and the inlet is disposed below the rotor and the outlet is disposed above the rotor, and wherein the flow of fluid through the chamber is generally upward.

10. The flow meter of claim 1 wherein the flow chamber is elongated.

11. A method of measuring fluid flow, comprising:
    a. directing fluid into an inlet to a cylindrical flow chamber having an axis and a cylindrical interior wall such that the fluid enters the chamber in a direction generally tangential to the interior wall;
    b. moving the fluid from the inlet axially through the chamber and wherein as the fluid moves axially through the chamber, at least some of the fluid tends to move through the chamber in a spiraling fashion;
    c. the fluid engaging a rotor rotatively mounted generally about the axis of the flow chamber;
    d. the rotor being axially spaced relative to the axis of the flow chamber, from the inlet where the fluid entered the chamber;
    e. the fluid rotating the rotor as the fluid moves past the rotor; and
    f. directing the fluid out an outlet axially spaced relative to the axis of the flow chamber, from the rotor and disposed opposite the inlet such that the rotor lies between the inlet and the outlet.

12. The method of claim 11 wherein the outlet is oriented generally tangential to the interior wall of the chamber.

13. The method of claim 11 wherein the fluid upon initially entering the chamber will move axially through the chamber before engaging the rotor, after engaging the rotor the fluid will move still further axially without engaging the rotor before being directed out of the chamber.

14. The method of claim 11 wherein the fluid spirals through the chamber and engages and rotates the rotor.

15. The method of claim 11 including measuring the flow rate of fluid passing through the chamber by measuring the revolutions of the rotor.

16. The method of claim 11 including vertically orienting the chamber such that the inlet is disposed below the outlet such that the fluid passing through the chamber must move upwardly.

17. The method of claim 16 including fixing the flow meter such that the flow of fluid through the chamber must move upwardly around the vertical axis of the chamber.

18. A flow meter for measuring fluid flow, comprising:
    a. a housing;
    b. a cylindrical flow chamber having a cylindrical interior wall, an axis, and opposed end portions;
    c. an inlet formed at one end portion of the chamber for directing fluid into the chamber;
    d. an outlet formed at the other end portion of the chamber for directing fluid out of the chamber;
    e. wherein the inlet and outlet are axially spaced, relative to the axis of the flow chamber, and disposed on opposite end portions of the chamber;
    f. a rotor rotatively mounted about the axis of the chamber and axially spaced, along he axis of the flow chamber, between the inlet and outlet such that the inlet, outlet and rotor lie in separate transverse planes; and
    g. wherein the chamber, inlet, outlet, and rotor are arranged such that the fluid entering the chamber at the inlet is constrained to move axially through the chamber past the rotor and then to the outlet where the fluid exits the chamber.

19. The flow meter of claim 18 wherein the housing includes a bore extending entirely through the housing and wherein opposed ends of the bore are threaded; and wherein the flow meter includes a pair of threaded plugs secured into the opposed ends of the bore, and wherein the flow chamber is formed by the housing, the bore, and the threaded plugs.

20. The flow meter of claim 18 wherein the inlet enters the chamber generally tangential to the interior cylindrical wall of the chamber.

21. The flow meter of claim 20 wherein the outlet enters the chamber generally tangential to the interior cylindrical wall of the chamber.

22. The flow meter of claim 18 wherein the flow chamber is elongated.

23. A method of measuring fluid flow, comprising:
a. directing fluid into an inlet of a cylindrical chamber having an axis where the fluid enters the chamber in a direction not aligned with the axis of the chamber;
b. moving the fluid from the inlet axially through the chamber to where the fluid contacts and rotates a rotor mounted about the axis of the chamber and axially spaced, relative to the axis of the chamber, from the inlet;
c. moving the fluid from the rotor axially through the chamber to an outlet and directing the fluid from the chamber out the outlet in a direction not aligned with the axis of the chamber; and
d. wherein the inlet and outlet are disposed on opposite sides of the rotor with the inlet and outlet being not aligned and axially spaced with respect to the axis of the chamber.

24. The method of claim 23 including directing the fluid through the inlet into the chamber in a direction generally tangential to an interior wall of the chamber.

25. The method of claim 23 including spiraling the fluid axially through the chamber as the fluid moves from the inlet, into engagement with the rotor, and from the rotor to the inlet.

26. The method of claim 23 including measuring the rate of fluid passing through the chamber by measuring the revolutions of the rotor.

27. The method of claim 23 including vertically orienting the chamber such that the inlet is disposed below the outlet.

* * * * *